United States Patent
Patanawongyuneyong

(10) Patent No.: US 6,352,735 B1
(45) Date of Patent: Mar. 5, 2002

(54) PROCESS OF INCORPORATING KONJAC PASTE INTO A MEAT TO PROVIDE A LOW CALORIE MEAT PRODUCT

(75) Inventor: Surach Patanawongyuneyong, Bangkok (TH)

(73) Assignee: Sahachol Food Supplies Co., Ltd. (TH)

( * ) Notice: Subject to any disclaimer, the term of this patent is extended or adjusted under 35 U.S.C. 154(b) by 0 days.

(21) Appl. No.: 09/693,808

(22) Filed: Oct. 20, 2000

(51) Int. Cl.[7] .............................. A23L 1/31; A23L 1/05
(52) U.S. Cl. ...................... 426/574; 426/578; 426/646; 426/652; 426/519; 426/524
(58) Field of Search ................................ 426/574, 578, 426/646, 652, 518, 519, 524

(56) References Cited

U.S. PATENT DOCUMENTS

| | | | | |
|---|---|---|---|---|
| 4,427,704 A | * | 1/1984 | Cheney et al. ............... | 426/104 |
| 4,876,103 A | * | 10/1989 | Kawano et al. .............. | 426/574 |
| 5,164,213 A | * | 11/1992 | Bonkowski .................. | 426/281 |
| 5,167,977 A | * | 12/1992 | Gamay ........................ | 426/417 |
| 5,308,636 A | * | 5/1994 | Tye et al. .................... | 426/573 |
| 5,603,976 A | * | 2/1997 | Share et al. ................. | 426/574 |
| 5,693,356 A | * | 12/1997 | Mandava et al. ........... | 426/574 |

OTHER PUBLICATIONS

Food and Drug Administration Ministry of Public Health, Nonthaburi, Thailand certification of "Natural Identicial Orange Flavoured Konjac Powder Beverage (Konyakky Brand)," Registration No. 82/2538, issued on Nov. 20, 1998.

* cited by examiner

*Primary Examiner*—Nina Bhat
(74) *Attorney, Agent, or Firm*—Brinks Hofer Gilson & Lione

(57) ABSTRACT

This invention discloses the method of producing a food product by dissolving konjac flour in alcohol to form a paste, mixing ingredients such as soybean protein, a viscosity enhancing agent, a gelatinizing agent and a hardening agent with the paste, freezing the paste mixture and then kneading the frozen mixture with frozen processed meat to produce a good tasting low fat meat product.

2 Claims, No Drawings

PROCESS OF INCORPORATING KONJAC PASTE INTO A MEAT TO PROVIDE A LOW CALORIE MEAT PRODUCT

FIELD OF INVENTION

The present invention relates to a new method of manufacturing low-calorie food products from processed meat while keeping the product from shrinking by heating and maintaining juicy taste and flavor. In particular this invention is related to a method of manufacturing food products in frozen condition by freezing konjac paste prepared at low temperature.

BACKGROUND OF INVENTION

It is proposed that quality of kneaded product can be considerably improved by combining with konjac manan. In addition, the effect of konjac manan can be enhanced by combining with substances such as starches, gums, or proteins.

Processed products from konjac roots are popular as diet or health food and are being tested in many other applications due to abundance of fibres and low calorie.

In recent years, the good qualities of konjac manan which is the ingredient of konjac such as water retention power, low calorie, and viscosity enhancement have drawn attention to many applications in industry producing fishery kneaded products and meat kneaded products.

This can be seen in samples of applications in fishery kneaded products (U.S. Pat. No. 1,112,808, Tokkai Hei 2-69164) or meat kneaded products (Tokkai Sho 57-3351) where water retention power of konjac manan is utilized in combination with starches, gums, and proteins.

Applications are not limited to creation of new texture to improve quality such as flavor, heat shrinkage, dripping, etc. by combining konjac manan to ground-meat-based processed food such as hamburgers, sausages, but also include proposed method to combine konjac manan with ground meat in water saturated gelatin condition without expansion (U.S. Pat. No. 2,741,450). In addition, other methods such as mixing partially defrozen konjac with the main ingredient at 5 degree Celsius (Tokkai Hei 11-285361); dissolving and expanding konjac manan with water, add alkaline solution, heat, and then suddenly cool and finally mix with main ingredient (Tokkai Hei 4-152865), or mixing and stirring konjac powder in water, leave at a temperature of 2–8degree Celsius for over 8 hours to create sol, and adding hardening agent to create konjac for processed food in gelatin condition (Tokkai Hei 2-410).

Problems to be Solved by This Invention

This invention is aimed at solving problems in food production from processed meat such as dripping from heating, shrinkage from heating, hardening and degradation of flavor from heating, by modifying production conditions. However, no suitable conditions have been found.

Means to Solve Problems

The inventors of this method of producing food products from processed meat have conducted extensive researches related to the subject and succeeded in obtaining low-calorie food products from processed meat while maintaining other qualities such as no shrinkage and juicy flavors. In this invention, ingredients are prepared at a temperature of 15 to 20 degrees Celsius and suddenly frozen to obtain frozen stock. The frozen stock thus prepared is then mixed with the main ingredient such as frozen meat for hamburgers, sausages, meatballs, soft salamis, etc. at a temperature of −2 to −5 degrees Celsius.

Details of this invention will be given below. A frozen ingredient stock of this invention is dissolved in 3.5 to 4.5 weight units of alcohol and 80 to 85 weight units of cooled water at 15 to 20 degrees Celsius. Konjac powder 2.5 to 3.5 weight units is then dissolved and expanded in the alcohol-water solution prepared while maintaining the temperature at 15 to 20 degrees Celsius to obtain konjac paste containing alcohol. Next 5–15 weight units of starches, 0.1–1 weight units of soy bean protein, 0.1–0.5 weight units of viscosity enhancer, 0.1–0.5 weight units of gelatinizer, and 0.1–0.5 weight units of hardener are mixed in powder form uniformly. This mixture of ingredients in powder form is then kneaded quickly with konjac paste containing alcohol with the temperature maintained at 15–20 degrees Celsius. The kneaded product is then frozen instantly at temperature −35 degrees Celsius for 12 hours to obtain a frozen ingredient stock. After 12 hours this stock is moved to store in a refrigerator at −18 to −25 degrees Celsius.

Food products made from processed meat are prepared by warming hamburger frozen meat in frozen storage and frozen stock at −5 degrees Celsius for 48 hours. These two ingredients are then ground and mixed with a grinder while maintaining temperature at −2 to −5 degrees Celsius. The mixture of processed meat and frozen stock is then added with union, bread flour, eggs, salt, seasonings, spices (pepper, nutmeg, cinnamon, clobe, coriander) and kneaded together. Kneading can be done using kneaders, silence cutter, or other appropriate tools. The result is then molded into desired shapes while maintaining temperature at −2 to −5 degrees Celsius and then baked with a multi-purpose oven. The core temperature at this time is 75 degrees Celsius. The product is then frozen in a high-speed freezer. Batch processing of processed meat food products is performed using a continuous production system.

Konjac powder used in this invention can be either regular konjac manan or refined gucomanan.

Alcohol can be sorbitol, multitol, etc.

Starches used can be cornstarch, cassava starch, potato starch, etc.

Viscosity enhancer can be kyxanthan gum, gua gum, locust bean gum, etc.

Gelatinzer can be cardran, agar, gelatin, kyxanthan gum, alginic salts, becktin, karaginan, protein, etc.

When applying konjac paste to food products from processed meat, a good combination or selection of processing condition along with addition of starches, gelatinizer, or viscosity enhancer will result in optimum water retention and flavors of konjac paste and tissue structure of food products from processed meat required to reduce dripping.

Hardener used can be calcium hydroxide

Preferred embodiments of this invention will be described below. However, this invention is not limited to such embodiments.

Embodiment 1

4 kg of sorbitol is dissolved in 82 kg of water cooled to a temperature 15–20 degrees Celsius. Konjac powder of 3 kg is then added and stirred while maintaining a temperature of 15–20 degrees Celsius. Stirring is stopped when finish adding and the mixture is kept still for 1 hour to expand. The subject is then mixed with 10 kg of cassava starch, 0.5 kg of soybean protein, 0.2 kg of sodium alginate, 0.3 kg of suisanka karusiumn in powder form to obtain a uniform mixture. This mixture with powder is then smoothly kneaded into konjac paste at a temperature of 15–20 degrees Celsius for a period not longer than 30 minutes. After this process of kneading, the paste is frozen immediately at a temperature of −35 degree Celsius for a period of 12 hours to obtain frozen ingredient stock, which is then moved to store in a refrigerator at a temperature of −18 to −25 degree Celsius.

Next, 38 kg of frozen chicken meat for hamburger and 38 kg of frozen ingredient stock kept in frozen condition are warmed for 48 hours to a temperature of −5 degree Celsius. After warming, these frozen chicken meat for hamburger and frozen ingredient stock are ground and mixed together while maintaining a temperature at −2 to −5 degree Celsius. Then 10 kg of onion, 9 kg of bread flour, 4 kg of eggs, 0.65 kg of salt, 0.17 kg of glutamic soda, and 0.18 kg of pepper are added and kneaded together while maintaining a temperature at −2 to −5 degree Celsius. Kneading can be done using a kneader or silent cutter, but not limited to these. Next, the mixture is molded into a piece of 100 g while maintaining a temperature at −2 to −5 degree Celsius and heated continuously with an oven (multi-purpose oven) at a core temperature of 75 degree Celsius. The result is then moved into a rapid freezer and frozen to obtain frozen chicken hamburgers. This chain of processing steps is performed using continuous production facility.

Impact of This Invention

This invention has made possible a method to produce food products from processed meat by producing ingredient stock at low temperature without heating and employing new process for molding and kneading ingredient meat, ingredient stock, and additive stock at low temperature of −2to −5 degree Celsius. This new method help solved problems such as missing of juiciness taste, tough meat, shrinkage, and severe dripping, especially by microwave heating during preparation.

A method for optimizing production line for food products from processed meat has also been established by employing frozen ingredient stock method invented, thereby making continuous production possible.

What is claimed is:

1. A method of producing food products from processed meat including the steps of:

creating a solution by dissolving alcohol in cool water of 15° C.–20° C.;

dissolving and expanding konjac powder in the solution to obtain a konjac paste;

mixing starches, soybean protein, a viscosity-enhancing agent, a gelatinizing agent, and a hardening agent in powder condition with said konjac paste to form a konjac paste mixture;

kneading the konjac paste mixture quickly while maintaining the temperature at 15° C.–20° C.

instantly freezing the konjac paste mixture to obtain a frozen stock of this invention, and mixing and kneading said frozen stock with frozen processed meat at a temperature of −2° C.–50° C.

2. The method of producing food products from processed meat according to claim 1, wherein said processed meats include hamburger, hamburger patte, sausage, or soft salami.

* * * * *

UNITED STATES PATENT AND TRADEMARK OFFICE
CERTIFICATE OF CORRECTION

PATENT NO. : 6,352,735 B1
DATED : March 5, 2002
INVENTOR(S) : S. Patanawongyuneyong It is certified that error appears in the above-identified patent and that said Letters Patent is hereby corrected as shown below:

Column 14,
Line 24, delete "of -2º C. -50º C." and substitute -- of -2º C. -5º C. -- in its place.

Signed and Sealed this

Twelfth Day of November, 2002

Attest:

Attesting Officer

JAMES E. ROGAN
Director of the United States Patent and Trademark Office